United States Patent
Naya et al.

(10) Patent No.: US 10,928,912 B2
(45) Date of Patent: Feb. 23, 2021

(54) VISUAL SENSE AND TACTILE SENSE INTEGRATED PRESENTATION DEVICE

(71) Applicant: FUJIFILM Corporation, Tokyo (JP)

(72) Inventors: Masayuki Naya, Kanagawa (JP); Takahiro Sano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/568,796

(22) Filed: Sep. 12, 2019

(65) Prior Publication Data
US 2020/0004339 A1  Jan. 2, 2020

Related U.S. Application Data

(63) Continuation of application No. PCT/JP2018/003486, filed on Feb. 1, 2018.

(30) Foreign Application Priority Data

Mar. 27, 2017 (JP) .............................. JP2017-060931

(51) Int. Cl.
G06F 3/01 (2006.01)
G06F 3/041 (2006.01)

(52) U.S. Cl.
CPC ............ G06F 3/016 (2013.01); G06F 3/0416 (2013.01); *G06F 3/0414* (2013.01)

(58) Field of Classification Search
CPC .............. G06F 3/016; G06F 2203/014; G06F 2203/04809; G09G 2320/08; G09G 2320/0242; G09G 2320/0666; G09G 2320/10; G09G 2380/10; G09G 2340/0492; G09G 2340/14; G09G 2354/00;
(Continued)

(56) References Cited

U.S. PATENT DOCUMENTS

| 6,283,598 B1* | 9/2001 | Inami ..................... G02B 30/56 |
| | | 353/31 |
| 2007/0035511 A1* | 2/2007 | Banerjee ................. G06F 3/011 |
| | | 345/156 |

(Continued)

FOREIGN PATENT DOCUMENTS

| EP | 1 024 327 A1 | 8/2000 |
| JP | 2000-029589 A | 1/2000 |

(Continued)

OTHER PUBLICATIONS

International Search Report dated Apr. 17, 2018, issued by the International Searching Authority in corresponding application No. PCT/JP2018/003486.

(Continued)

*Primary Examiner* — Dong Hui Liang
(74) *Attorney, Agent, or Firm* — Sughrue Mion, PLLC

(57) ABSTRACT

A visual sense-and-tactile sense integrated presentation device includes a half mirror, a visual sense presentation body that presents visual information about an object and is disposed on a mirror surface side of the half mirror, and a tactile sense presentation body that presents tactile information and is disposed to face the visual sense presentation body across the mirror surface of the half mirror at an optical distance from the half mirror equal to an optical distance between the half mirror and the visual sense presentation body.

14 Claims, 7 Drawing Sheets

(58) Field of Classification Search
CPC .... G09G 3/342; G09G 3/3413; G09G 3/3648; G09G 5/10; G09G 5/026; G09G 5/14; G09G 2300/0456; G09G 2360/144; G09G 2330/021
See application file for complete search history.

(56) References Cited

U.S. PATENT DOCUMENTS

| | | | |
|---|---|---|---|
| 2008/0291061 A1* | 11/2008 | Kim | G06F 3/0362 341/35 |
| 2009/0250267 A1 | 10/2009 | Heubel et al. | |
| 2010/0110384 A1* | 5/2010 | Maekawa | G02B 5/124 353/10 |
| 2011/0080273 A1* | 4/2011 | Kawai | G06F 3/016 340/407.1 |
| 2012/0133622 A1 | 5/2012 | Brokken et al. | |
| 2018/0136730 A1* | 5/2018 | Hayashi | G06F 3/0304 |

FOREIGN PATENT DOCUMENTS

| | | |
|---|---|---|
| JP | 2001-025511 A | 1/2001 |
| JP | 2008-027223 A | 2/2008 |
| JP | 2011-519082 A | 6/2011 |
| JP | 2013-501992 A | 1/2013 |
| JP | 2014-145456 A | 8/2014 |
| JP | 2016-110383 A | 6/2016 |

OTHER PUBLICATIONS

Written Opinion dated Apr. 17, 2018, issued by the International Searching Authority in corresponding application No. PCT/JP2018/003486.
International Preliminary Report on Patentability dated Jul. 5, 2018, issued by the International Preliminary Examining Authority in corresponding application No. PCT/JP2018/003486.
Office Action dated May 26, 2020 in Japanese Application No. 2019-508670.

* cited by examiner

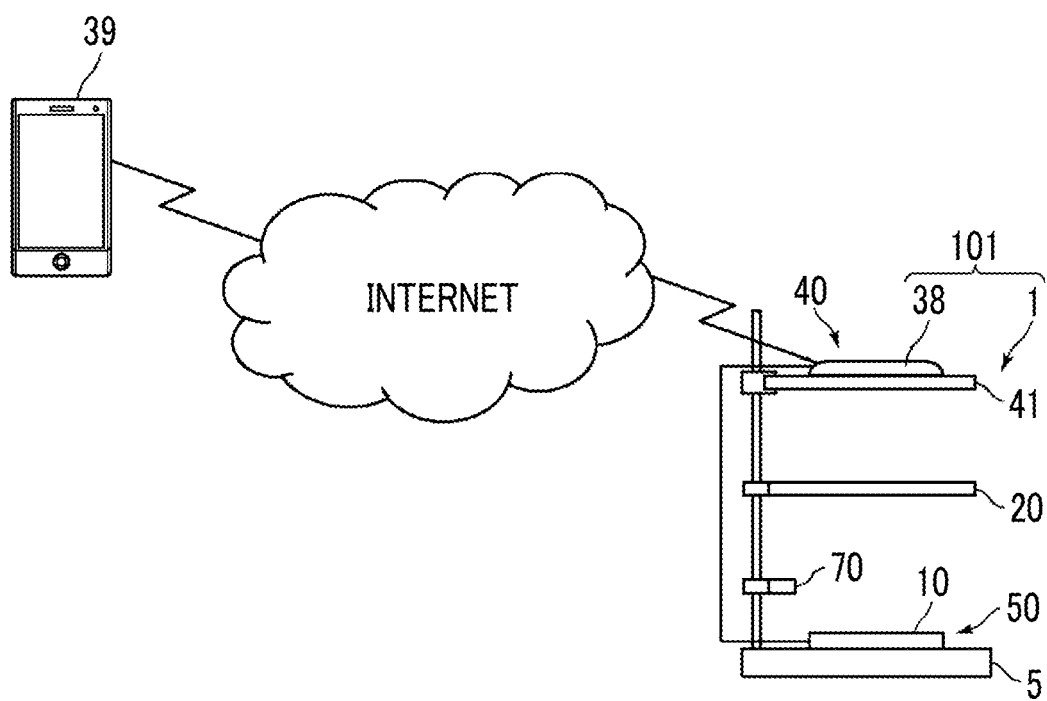

VISUAL SENSE AND TACTILE SENSE INTEGRATED PRESENTATION DEVICE

CROSS-REFERENCE TO RELATED APPLICATIONS

This application is a continuation application of International Application No. PCT/JP2018/003486, filed Feb. 1, 2018, the disclosure of which is incorporated herein by reference in its entirety. Further, this application claims priority from Japanese Patent Application No. 2017-060931, filed Mar. 27, 2017, the disclosure of which is incorporated herein by reference in its entirety.

BACKGROUND

Field of the Invention

The present invention relates to a visual sense-and-tactile sense integrated presentation device that integrates information to be recognized through a visual sense and information to be recognized through a tactile sense serving as one skin sense and presents the information.

Related Art

A display device, which displays a two-dimensional or three-dimensional image to be recognized through a visual sense, has been well known in the past. On the other hand, a device, which outputs tactile information, such as information about unevenness, while making such an image and the tactile information interlock with each other, has been proposed in recent years (JP2016-110383A, JP2013-501992A, JP2004-145456A, and the like).

In recent years, an interaction between senses (cross-modality), which complements information acquired through another sense by information acquired through one of senses of a human and recognizes and analyzes an object, has been studied much. Further, a technique, which applies cross-modal characteristics of the senses of a human to an interface, has been examined.

JP2016-110383A proposes a tactile sense transmission device that comprises a visual information display unit displaying visual information and a tactile information presentation unit presenting tactile information. The tactile sense transmission device causes the visual information display unit to display a shirt, which is an object, and presents the feel of touch by the tactile information presentation unit. Accordingly, a user can recognize the object through a visual sense and can experience the feel.

JP2013-501992A, JP2004-145456A, and the like propose information output devices that comprise image information output means for displaying image information about an object and tactile information output means for outputting tactile information by deformation based on information corresponding to the surface state of the object. Since the information output devices proposed in JP2013-501992A, JP2004-145456A, and the like are adapted to allow a user to correctly recognize the uneven shape of the surface of the object through a visual sense and a tactile sense, the texture of the object can be provided as information.

However, since the visual information display unit and the tactile information presentation unit are separately arranged in the tactile sense transmission device proposed in JP2016-110383A, a portion actually touched by a user is different from a portion of an object of which the image is displayed. For this reason, the improvement of a visual texture caused by a cross-modal effect is not obtained.

On the other hand, in JP2013-501992A and JP2004-145456A, the image information output means and the tactile information output means are stacked and tactile information can be output while overlapping with the display of an image. Accordingly, an effect of more realistically feeling a texture corresponding to the uneven shape of the object can be obtained. However, since the image information output means and the tactile information output means are stacked, the tactile information output means cannot be easily replaced. That is, since tactile information, which can be presented, is limited, it is difficult to cope with a wide variety of feels. Further, an image displayed by the image information output means becomes the shadow of the hand of a user. There is a drawback that the image of a portion actually touched may not be easily seen. Furthermore, it is difficult to apply the information output device to a case where an object is a three-dimensional object.

SUMMARY

The invention has been made in consideration of the above-mentioned circumstances, and an object of the invention is to provide a visual sense-and-tactile sense integrated presentation device that allows a user to experience the more realistic textures or feels of two-dimensional and three-dimensional objects.

A visual sense-and-tactile sense integrated presentation device according to an aspect of the invention is a visual sense-and-tactile sense integrated presentation device comprising a half mirror, a visual sense presentation body that presents visual information about an object and is disposed on a mirror surface side of the half mirror, and a tactile sense presentation body that presents tactile information and is disposed to face the visual sense presentation body across the mirror surface of the half mirror at an optical distance from the half mirror equal to an optical distance between the half mirror and the visual sense presentation body.

It is preferable that the visual sense-and-tactile sense integrated presentation device according to the aspect of the invention further comprises a finger illuminator illuminating a finger of a user touching the tactile sense presentation body.

It is preferable that the finger illuminator is disposed between the mirror surface and the tactile sense presentation body, and applies illumination light, of which spread toward the mirror surface and the tactile sense presentation body is limited, to a space between the mirror surface and the tactile sense presentation body.

Further, it is preferable that the finger illuminator applies the illumination light in two different directions.

It is preferable that a wavelength of the illumination light of the finger illuminator is a wavelength of monochromatic light.

In the visual sense-and-tactile sense integrated presentation device according to the aspect of the invention, the visual sense presentation body may be an image carrier displaying an image of the object or may be an object itself formed of a three-dimensional object. In a case where the visual sense presentation body is the image carrier, "the virtual image of the object" means the virtual image of the image of the object. The image displayed by the image carrier may be a static image or may be a motion picture. Further, the image displayed by the image carrier may be an image displayed on a display or the like or may be an image drawn on paper or the like.

The optical distance between the mirror surface and the visual sense presentation body is an optical distance between the image display surface of the visual sense presentation body and the mirror surface in a case where the visual sense presentation body is the image carrier, and is an optical distance between the mirror surface and a point on the visual sense presentation body closest to the mirror surface in a case where the visual sense presentation body is a three-dimensional object.

In the visual sense-and-tactile sense integrated presentation device according to the aspect of the invention, the tactile sense presentation body may be a plane object or a three-dimensional object that includes a texture structure on a surface thereof.

The optical distance between the mirror surface and the tactile sense presentation body is an optical distance between the mirror surface and the surface of the tactile sense presentation body in a case where the tactile sense presentation body is the plane object, and is an optical distance between the mirror surface and a point on the tactile sense presentation body closest to the mirror surface in a case where the tactile sense presentation body is the three-dimensional object.

In the visual sense-and-tactile sense integrated presentation device according to the aspect of the invention, the tactile sense presentation body may comprise an artificial skin-sense presentation device.

A skin sense is the generic term of a sense based on a receptor present in the skin, and includes a tactile sense, a sense of pressure, a sense of warmth, a sense of cold, and a sense of pain. The artificial skin-sense presentation device is a device that artificially causes static electricity, electricity, vibration, ultrasonic waves, a change in temperature, or the like stimulating a skin sense.

It is preferable that the visual sense-and-tactile sense integrated presentation device according to the aspect of the invention comprises a display as the visual sense presentation body and further comprises an information processing unit. The information processing unit is connected to the display and the artificial skin-sense presentation device, and changes a skin-sense presentation state of the artificial skin-sense presentation device while interlocking with a change of an image to be displayed on the display.

It is preferable that the visual sense-and-tactile sense integrated presentation device according to the aspect of the invention further comprises a sensor detecting a position of the finger of the user and the information processing unit controls the skin-sense presentation state of the artificial skin-sense presentation device on the basis of position information acquired by the sensor.

The visual sense-and-tactile sense integrated presentation device according to the aspect of the invention may comprise an information terminal as the visual sense presentation body.

A visual sense-and-tactile sense integrated presentation device according to an aspect of the invention comprises a half mirror, a visual sense presentation body that presents visual information about an object and is disposed on a mirror surface side of the half mirror, and a tactile sense presentation body that presents tactile information and is disposed to face the visual sense presentation body across the mirror surface of the half mirror at an optical distance from the half mirror equal to an optical distance between the half mirror and the visual sense presentation body. According to the configuration, since the virtual image of the object can be displayed while coinciding with the tactile sense presentation body, a user recognizes the virtual image through a visual sense while touching the tactile sense presentation body on which the virtual image of the object is displayed. Accordingly, a visual sense and a tactile sense are stimulated at the same time, so that a cross-modal effect is obtained and the user can more realistically experience the texture of the object.

BRIEF DESCRIPTION OF THE DRAWINGS

FIG. 8 is a diagram showing a system that includes the visual sense-and-tactile sense integrated presentation device according to the embodiment of the invention and can make Internet communication.

DETAILED DESCRIPTION

Embodiments of the invention will be described below with reference to the drawings.

Figure 1:
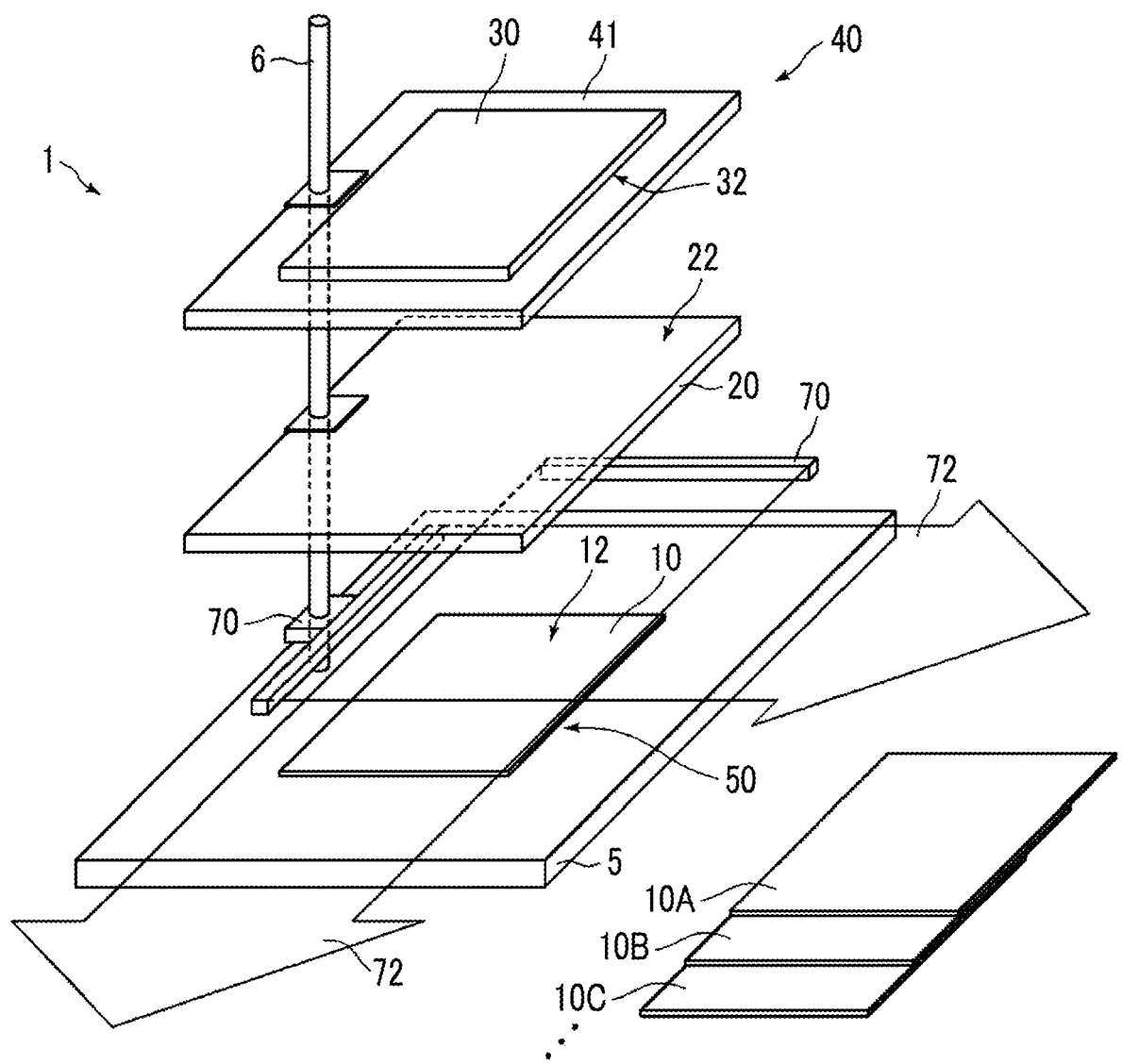
FIG. 1 is a perspective view showing the schematic configuration of a visual sense-and-tactile sense integrated presentation device according to a first embodiment of the invention.
Figure 2:
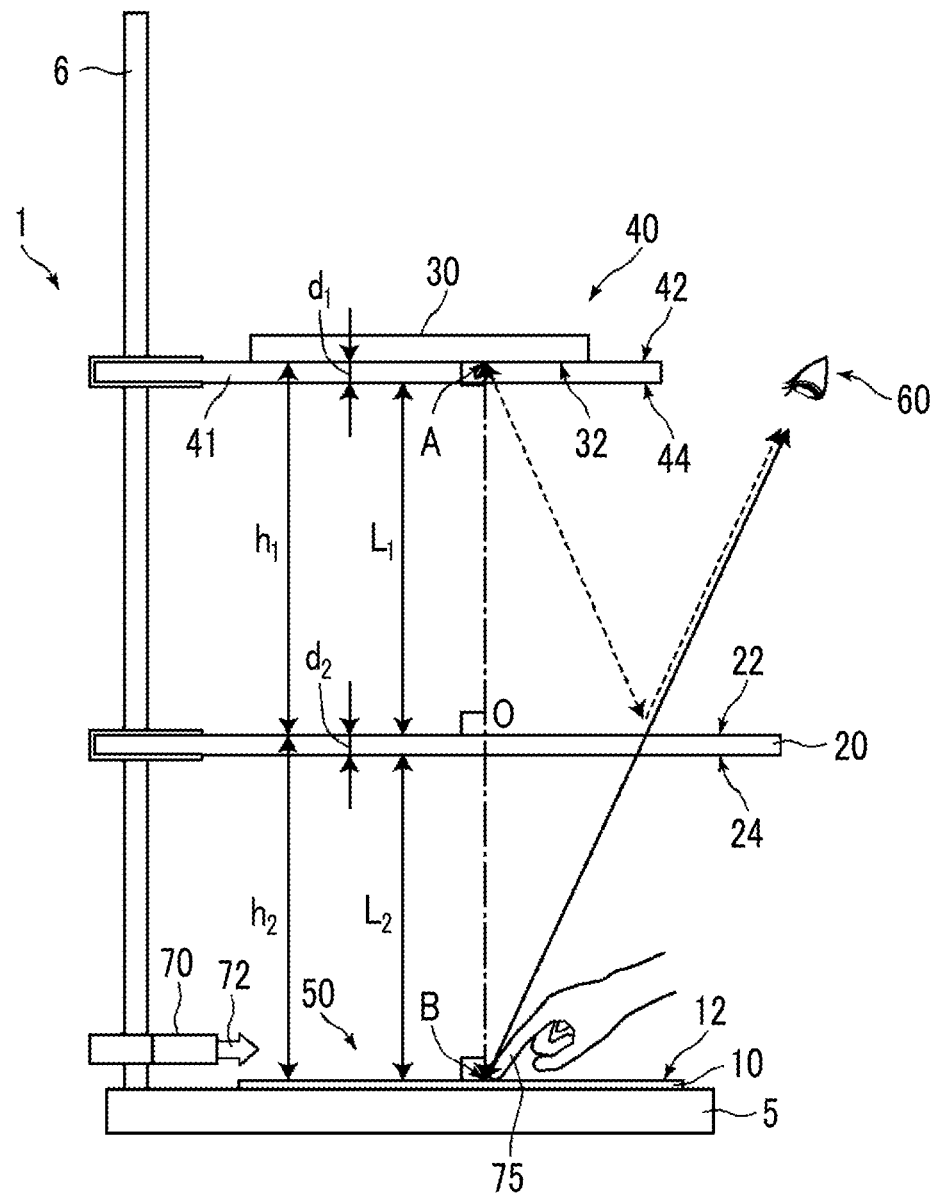
FIG. 2 is a side view showing a positional relationship between main parts of the visual sense-and-tactile sense integrated presentation device shown in FIG. 1.

FIG. 1 is a perspective view showing the schematic configuration of a visual sense-and-tactile sense integrated presentation device according to an embodiment of the invention, and FIG. 2 is a side view showing a positional relationship between main parts of the visual sense-and-tactile sense integrated presentation device 1 according to this embodiment.

As shown in FIGS. 1 and 2, the visual sense-and-tactile sense integrated presentation device 1 (hereinafter, simply referred to as an "integrated presentation device 1") comprises a half mirror 20, a visual sense presentation unit 40 that is disposed on a mirror surface 22 side of the half mirror 20, and a tactile sense presentation unit 50 that is positioned to be optically symmetric to the visual sense presentation unit 40 across the mirror surface 22 of the half mirror 20. A visual sense presentation body 30, which presents visual information about an object, is disposed on the visual sense presentation unit 40. Further, a tactile sense presentation body 10, which is disposed across the mirror surface at a distance from the mirror surface equal to the distance between the visual sense presentation body 30 and the mirror surface, is provided on the tactile sense presentation unit 50, and the integrated presentation device 1 is adapted to display the virtual image of the object so that the virtual image of the object coincides with the tactile sense presentation body 10. Here, the mirror surface 22 is a surface that reflects a part of incident light and transmits a part of the incident light.

Here, the visual sense presentation unit 40 is a part of the integrated presentation device 1 on which the visual sense presentation body 30 is to be disposed, and the tactile sense presentation unit 50 is a part of the integrated presentation device 1 on which the tactile sense presentation body 10 is to be disposed likewise.

Since the visual sense presentation unit 40 is provided with a support plate 41 on which the visual sense presentation body 30 is to be placed in this embodiment, a user can place an arbitrary visual sense presentation body on the support plate 41 at the time of use.

The integrated presentation device 1 comprises a support base 5 on which the tactile sense presentation body 10 is to be placed, and a support shaft 6 that supports the half mirror 20 and the support plate 41 at predetermined positions above the support base 5. It is preferable that the half mirror 20 and the support plate 41 are adapted to be vertically movable along the support shaft 6.

In the invention, the visual sense presentation body may be an image carrier that displays the image of an object to present visual information about the object, and may be an object itself that is a three-dimensional object. As long as the image carrier displays an image on an image display surface thereof, the image carrier is not particularly limited. For example, the image carrier may be a paper medium, such as a sheet on which an image is drawn on one side, and may be a display that displays an image. A flat-panel display is suitable as the display. The display may be a display that is connected to a separate computer body by radio or wire and displays an image received from the computer, and may be the display of a portable information terminal, such as a tablet computer or a smartphone.

In the invention, the tactile sense presentation body may be a plane object or may be a three-dimensional object. The material of the surface of the tactile sense presentation body is not particularly limited, and metal, wood, plastic, fabric, rubber, or the like can be used as the material of a surface according to a tactile sense to be presented. Further, the tactile sense presentation body may have a texture structure on the surface thereof. Here, the plane object means a sheet-like or thin plate-like member. A plurality of tactile sense presentation bodys presenting tactile information different from each other may be prepared, and a user may appropriately select a tactile sense presentation body and dispose the tactile sense presentation body on the tactile sense presentation unit according to an object about which visual information is presented by the visual sense presentation body.

The visual sense presentation body 30 is an image carrier that displays the two-dimensional image of an object in this embodiment, and the visual sense presentation body 30 will be paraphrased as an image carrier 30 in the following description of this embodiment. The image carrier 30 includes an image display surface 32 that displays an image, and is disposed so that the image display surface 32 faces the support plate 41. The support plate 41 has transparency that allows the image displayed on the image display surface 32 to be reflected to the mirror surface 22, and it is preferable that the support plate 41 is a transparent substrate transparent to visible light, such as a glass plate or an acrylic plate. Since the reflectivity of the surface of a glass plate or an acrylic plate is about 4% and the brightness of the image display surface is reduced through the plate, it is preferable that both surfaces 42 and 44 (see FIG. 2) of the support plate 41 are subjected to anti-reflective treatment. It is preferable that the reflectivity of each of both the surfaces 42 and 44 of the support plate 41 for visible light (380 to 780 nm) is less than, for example, 1%.

The tactile sense presentation body 10 is a sheet that is made of, for example, rubber material. Further, a plurality of sheets having different feels, such as a plastic sheet 10A, a stainless steel plate 10B, and a cork plate 10C, are provided in addition to the tactile sense presentation body 10 that is provided on the support base 5.

The mirror surface 22 of the half mirror 20 of this embodiment is a surface facing the image carrier 30; and the surface 12 of the tactile sense presentation body 10, the mirror surface 22, and the image display surface 32 are positioned so that an optical distance $h_1$ between the image display surface 32 and the mirror surface 22 is equal to an optical distance $h_2$ between the mirror surface 22 and the surface 12 of the tactile sense presentation body 10. That is, an optical distance $h_1$ between an arbitrary point O positioned on the mirror surface 22 and an intersection point A of the image display surface 32 and a perpendicular, which passes through the arbitrary point O and perpendicularly intersects the mirror surface 22, is equal to an optical distance $h_2$ between the arbitrary point O and an intersection point B of the perpendicular and the surface 12 of the tactile sense presentation body 10.

In this example, the optical distance $h_1$ between the image display surface 32 and the mirror surface 22 is represented by the sum of the product $n_1 \cdot d_1$ of the thickness $d_1$ and the refractive index $n_1$ of the support plate 41 and a distance $L_1$ between a lower surface 44 of the support plate 41 and the mirror surface 22, that is, "$h_1 = n_1 \cdot d_1 + L_1$". Further, the optical distance $h_2$ between the mirror surface 22 and the surface 12 of the tactile sense presentation body 10 is represented by the sum of the product $n_2 \cdot d_2$ of the thickness $d_2$ and the refractive index $n_2$ of the half mirror 20 and a distance $L_2$ between a lower surface 24 of the half mirror 20 and the surface 12, that is, "$h_2 = n_2 \cdot d_2 + L_2$".

Since the position of the half mirror 20 and the position of the image display surface 32 are adjusted so that the optical distances $h_1$ and $h_2$ are equal to each other, the virtual image of an image displayed on the image display surface 32 of the image carrier 30 is displayed while coinciding with a position where the tactile sense presentation body 10 is disposed in a case where a user views the tactile sense presentation body 10 from the upper side of the half mirror 20 (the mirror surface 22 side) through the half mirror 20 as shown in FIG. 2. Here, "displayed while coinciding" means that the image plane of the virtual image is positioned on the surface 12 of the tactile sense presentation body 10. The surface 12 of the tactile sense presentation body 10 is a surface that is touched and felt by a user.

In this case, an image seems to be directly projected onto the tactile sense presentation body 10. However, a user actually sees the mirror image of an image reflected by the mirror surface 22 and the image is not directly projected onto the tactile sense presentation body 10 from the image carrier 30. The user visually recognizes the virtual image of the image, which is displayed on the image display surface 32, on the tactile sense presentation body 10. Accordingly, the image carrier 30 needs to display the mirror image of an object on the image display surface 32 as visual information.

Further, it is preferable that the brightness of the image display surface 32 of the image carrier 30 is adjusted to brightness, which allows the surface of the tactile sense presentation body 10 itself not to be visually recognized, by the brightness of the mirror image (virtual image) reflected by the half mirror 20.

Hereinafter, the position of eye in a case where a user views the tactile sense presentation body 10 from the mirror surface side of the half mirror 20 will be referred to as an observation part 60.

In a case where a user touches the surface 12 of the tactile sense presentation body 10 with the digit of the hand (finger) 75 while observing the virtual image of an image, which is displayed by the image carrier 30, (the image of an object) on the surface 12 of the tactile sense presentation body 10, a user can feel as though the user actually touches the object. Since visual information is complemented by tactile information, a user can more realistically recognize the virtual image of an object through an interaction between a visual sense and a tactile sense than a case where the user recognizes the virtual image of an object through only a visual sense. Since tactile information is complemented by visual information, a user can experience a more realistic feel through the interaction than a case where the user experiences a feel through only a tactile sense.

In a case where the stainless steel plate 10B is placed on the tactile sense presentation unit 50 in the case of an object made of metal and the plastic sheet 10A is placed on the tactile sense presentation unit 50 in the case of an object made of plastic so that a texture to be obtained from the image of an object through a visual sense and a texture to be obtained from the tactile sense presentation body 10 through a tactile sense correspond to each other, a user can experience a much more realistic texture.

The half mirror 20 is a member which includes the mirror surface 22 and an opposite surface 24 opposite to the mirror surface 22 and of which the mirror surface 22 and the opposite surface 24 are disposed in parallel to each other. The half mirror 20 has only to reflect at least a part of light incident on the mirror surface 22 and to transmit a part of the light, and the reflectivity of the mirror surface 22 may be appropriately determined in the range of 1% to 99% according to the configuration of the optical system of the integrated presentation device 1. It is more preferable that the reflectivity of the mirror surface 22 is in the range of 4% to 85%.

It is preferable that each of the mirror surface 22 and the opposite surface 24 of the half mirror 20 is formed of an anti-reflective surface. The reflectivity of the anti-reflective surface may be reflectivity that allows an image, which is formed by the reflection of light on the opposite surface 24 opposite to the mirror surface and is visually recognized from the observation part, not to be doubly reflected to an image, which is formed by the reflection of light on the mirror surface 22. The reflectivity of the anti-reflective surface is set to be lower than 0.1 times the reflectivity of the mirror surface 22.

The reflectivity of the anti-reflective surface with respect to light corresponding to a visible range is preferably set to be lower than 1%, and is more preferably set to 0.5% or less. The anti-reflective surface of which the reflectivity is lower than 1% can be obtained from publicly known anti-reflective treatment, such as the formation of a dielectric multilayer film or the formation of a fine uneven structure layer.

The reflectivity of the mirror surface 22 and the reflectivity of the opposite surface 24 opposite to the mirror surface are do not necessarily need to be constant over the entire surface.

The half mirror 20 comprises the mirror surface 22 on the side thereof facing the visual sense presentation unit 40 in the embodiment shown in FIG. 1, but may include the mirror surface 22 on the side thereof facing the tactile sense presentation unit 50. Even in this case, both the optical distances may be adjusted so that the virtual image of an image presented by the visual sense presentation body 30 coincides with the tactile sense presentation body 10.

In the invention, "the optical distances are equal to each other" means that the optical distances do not need to be exactly equal to each other and have only to be equal to each other so that there is no difference between a surface (the surface of the tactile sense presentation body) touched by the user and the position of a virtual image in a case where the user touches the tactile sense presentation body. However, in a case where a mirror image is displayed while coinciding with the tactile sense presentation body 10, it may be regarded that the optical distance between the image display surface 32 and the mirror surface 22 and the optical distance between the surface 12 of the tactile sense presentation body 10 and the mirror surface 22 are equal to each other.

According to the integrated presentation device of the embodiment of the invention, the degree of freedom of a tactile sense presentation body is high and it is possible to cope with various objects. Further, since a virtual image is displayed on the tactile sense presentation body, the shadow of a finger of a user is not formed and the user can obtain a high sense of realism.

Furthermore, the integrated presentation device 1 according to this embodiment comprises finger illuminators 70 that illuminate a finger 75 of the user being in contact with the tactile sense presentation body 10.

As already described, the shadow of the finger of the user is not formed in the virtual image displayed on the tactile sense presentation body 10. On the other hand, there is a case where a part of the virtual image overlaps with the finger of the user and is displayed on the finger of the user. In a case where the finger is illuminated by the finger illuminators 70 with brightness sufficiently higher than the brightness of the virtual image displayed on the finger of the user, it is possible to allow the user not to visually recognize the virtual image displayed on the finger. The reason for this is that the brightness of the virtual image is relatively lowered and the virtual image is not recognized with the eyes of a human since the finger is illuminated and becomes bright.

Since the integrated presentation device comprises the finger illuminators 70 and illuminates a finger as described above, the virtual image displayed on the finger is not seen and the finger of the user is visually recognized. Accordingly, the sense of the user touching the tactile sense presentation body 10 is further increased, so that a sense of realism is improved.

It is preferable that the finger illuminator 70 is an illuminator adapted to illuminate the finger 75 of the user without illuminating the mirror surface 22 and the tactile sense presentation body 10. Here, "without illuminating the mirror surface 22 and the tactile sense presentation body 10" means that a chief ray of illumination light is not incident on the mirror surface and the tactile sense presentation body 10, and does not exclude even a case where a part of illumination light is incident on the mirror surface 22 or the tactile sense presentation body 10 in a range not influenced by the above-mentioned effect.

The finger illuminators 70 of this embodiment are disposed between the mirror surface 22 and the tactile sense presentation body 10 in the height direction of the integrated presentation device 1, and apply light, of which the spread toward the mirror surface 22 and the tactile sense presentation body 10 is limited, to a space between the mirror surface 22 and the tactile sense presentation body 10. Here, each finger illuminator 70 applies light 72 that travels in parallel to the support base 5. The finger illuminator 70 has only to be capable of illuminating the finger of the user, and it is preferable that the finger illuminator 70 is provided to illuminate the finger of the user from the front side or to illuminate the finger from the lateral side. As shown in FIG. 1, the finger illuminators 70 may be installed on two different sides (the front side and the lateral side), respectively.

It is preferable that the light 72 emitted from the finger illuminator 70 is sheet-like light parallel to the support base 5, and the sheet-like light can be realized by the combination of a LED light source and a cylindrical lens. Light emitted from the LED light source can be applied as light, which is spread in the shape of a sheet substantially parallel to the support base 5, by the action of the cylindrical lens.

A white light source may be used as a light source to be included in the finger illuminator 70, and it is preferable that a monochromatic light source is used as the light source. It is preferable that a red light source or a green light source is used as the monochromatic light source, and, for example, a red LED having a peak wavelength in the range of 650 nm to 700 nm or a green LED having a peak wavelength in the range of 500 nm to 650 nm can be used as the monochromatic light source. The reason for this is that a finger illuminated by red light or green light does not cause a user to feel discomfort and can be clearly seen by the user.

Figure 3:
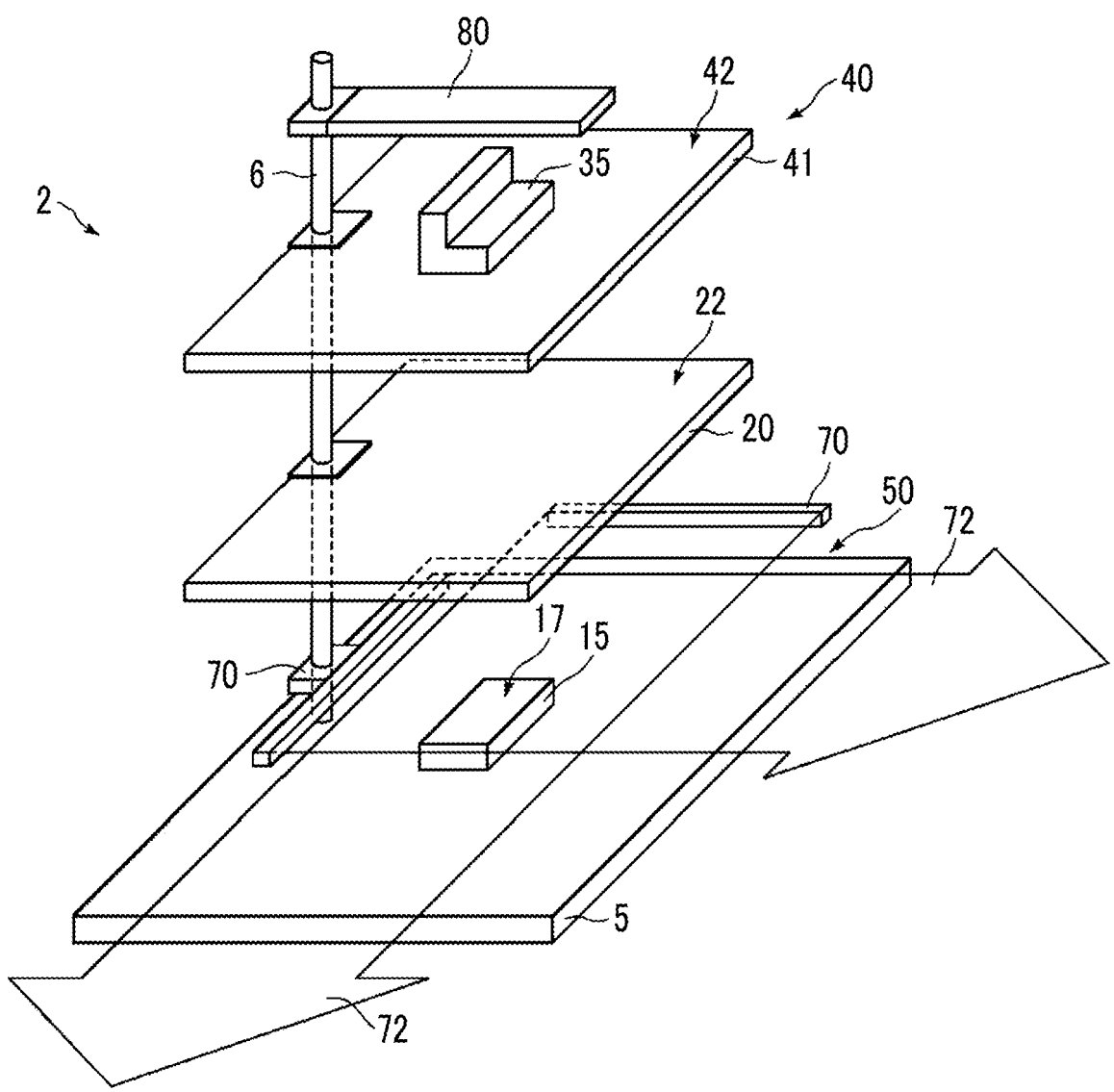
FIG. 3 is a perspective view showing the schematic configuration of a visual sense-and-tactile sense integrated presentation device according to a second embodiment of the invention.
Figure 4:
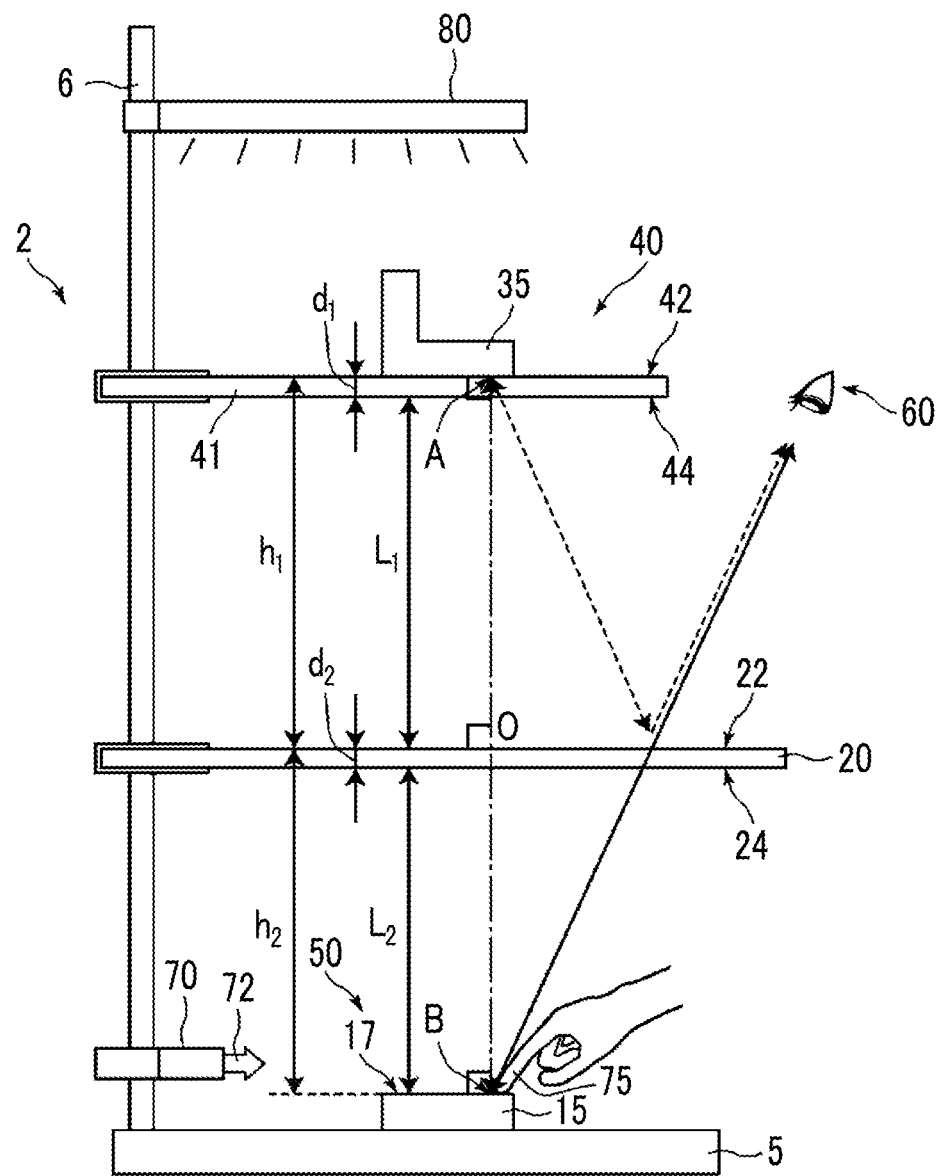
FIG. 4 is a side view showing a positional relationship between main parts of the visual sense-and-tactile sense integrated presentation device shown in FIG. 3.

FIG. 3 is a perspective view showing the schematic configuration of an integrated presentation device 2 according to a second embodiment, and FIG. 4 is a side view showing the schematic configuration thereof. The same components as the components of the integrated presentation device 1 according to the first embodiment will be denoted by the same reference numerals as the reference numerals of the components of the integrated presentation device 1, and the detailed description thereof will be omitted. The same applies to the following drawings.

The integrated presentation device 2 according to the second embodiment further comprises an illumination unit 80 that irradiates the visual sense presentation unit 40 with illumination light in addition to the integrated presentation device 1 according to the first embodiment. Even in a case where a visual sense presentation body is an image carrier, such as paper on which an image of an object is drawn on the surface, or the object itself, or the like, the visual sense presentation body is irradiated with illumination light, so that the image can be brightly reflected to the mirror surface 22. The illumination unit 80 is adapted to irradiate the visual sense presentation unit 40 from the upper side with illumination light in this example, but may be adapted to irradiate the visual sense presentation unit 40 from the lower side with illumination light. The illumination unit 80 can be formed of a fluorescent lamp, a white LED, or the like.

Further, in the integrated presentation device 2 according to this embodiment, a visual sense presentation body disposed on the visual sense presentation unit 40 is an object 35 itself and a tactile sense presentation body 15 disposed on the tactile sense presentation unit 50 is also a three-dimensional object likewise. As shown in FIG. 3, the object 35 disposed on the support plate 41 is a three-dimensional object having an L-shaped cross-section. On the other hand, the tactile sense presentation body 15 presented on the tactile sense presentation unit 50 is a three-dimensional object having the shape of a rectangular parallelepiped.

Both the object (visual sense presentation body) 35 and the tactile sense presentation body 15 are three-dimensional objects. Accordingly, here, the position of the support plate 41 and the position of the half mirror 20 are adjusted so that an optical distance between the mirror surface 22 and a point on the visual sense presentation body 35 closest to the mirror surface 22 and an optical distance between the mirror surface 22 and a point on the tactile sense presentation body 15 closest to the mirror surface 22 are equal to each other. Here, the point on the object 35 closest to the mirror surface 22 is positioned on the upper surface 42 of the support plate 41, and the point on the tactile sense presentation body 15 closest to the mirror surface 22 is positioned on a surface 17 of the tactile sense presentation body 15.

In a case where a visual sense presentation body is the object 35 itself that is a three-dimensional object as described above, the virtual image of the object 35, which is visually recognized from the lower surface 44 of the support plate 41 at the observation part 60, is observed while coinciding with a position where the tactile sense presentation body 15 is disposed. That is, the integrated presentation device 2 displays the virtual image of the visual sense presentation body 35 while making the virtual image of the visual sense presentation body 35 coinciding with the tactile sense presentation body 15.

According to this device 2, as in the case of the integrated presentation device 1 according to the first embodiment, a user touches the surface 17 of the tactile sense presentation body 15 with a finger (the digit of the hand) and sees the virtual image of the object 35, which is displayed while coinciding with the tactile sense presentation body 15, while feeling the surface 17 of the tactile sense presentation body 15. Accordingly, the user can feel as though the user actually touches the object 35.

Figure 5:
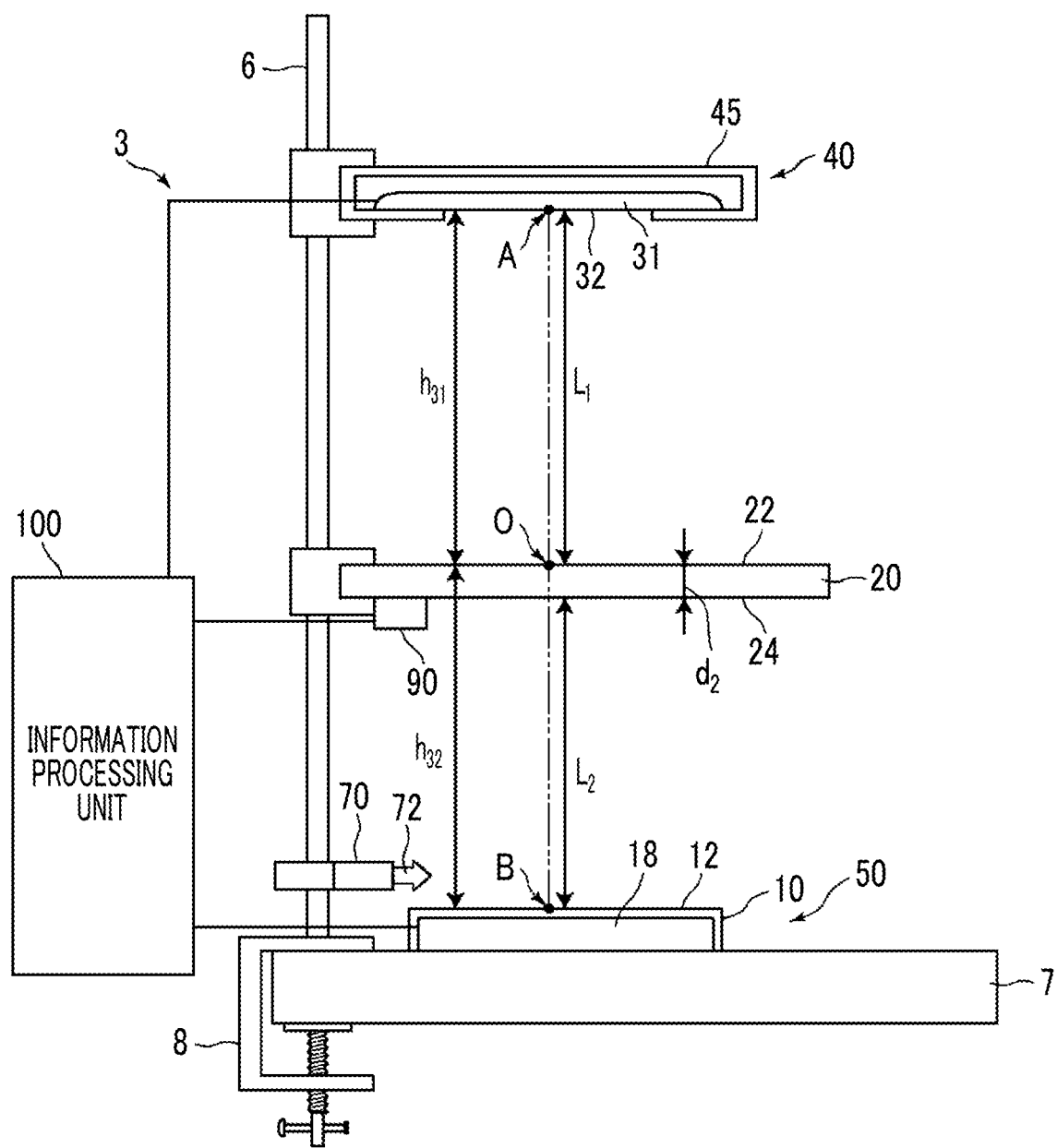
FIG. 5 is a side view showing the schematic configuration of a visual sense-and-tactile sense integrated presentation device according to a third embodiment of the invention.

FIG. 5 is a side view showing the schematic configuration of a visual sense-and-tactile sense integrated presentation device 3 according to a third embodiment of the invention.

The configuration, which comprises the support base 5 supporting the tactile sense presentation body 10, has been described in the visual sense-and-tactile sense integrated presentation devices 1 and 2 according to the first and second embodiments, but the visual sense-and-tactile sense integrated presentation device 3 according to this embodiment does not comprise the support base 5. The integrated presentation device 3 comprises a vise fixing unit 8, which is provided at the bottom of a support shaft 6 to install the integrated presentation device 3 on an existing desk, instead of the support base 5, and can be installed and used in a case where a top board 7 of the existing desk is clamped and fixed by a vise.

Further, the integrated presentation device 3 according to this embodiment comprises an image carrier holder 45, which holds a flat-panel display 31 (hereinafter, referred to as a display 31) as an aspect of an image carrier so that an image display surface 32 of the flat-panel display 31 directly faces a half mirror 20 as shown in FIG. 5, instead of the support plate 41 provided in the visual sense presentation unit 40 of the integrated presentation device 1 according to the first embodiment. The image carrier holder 45 includes an opening on at least one side as shown in FIG. 5, allows the display 31 to slide and be inserted from the opening, and supports at least two sides of the display 31 opposite to each other from the lower surface of the display. A frame member that supports at least two opposite ends of an image carrier from the lower surface of the carrier, or the like may be used as the image carrier holder.

Even in this embodiment, the position of a mirror surface 22 and the position of the image display surface 32 are adjusted so that an optical distance $h_{31}$ between the image display surface 32 and the mirror surface 22 and an optical distance $h_{32}$ between the mirror surface 22 and a surface 12 of a tactile sense presentation body 10 are equal to each other.

In this example, the optical distance $h_{31}$ between the image display surface 32 and the mirror surface 22 is a distance $L_1$ between the image display surface 32 and the mirror surface 22, that is, "$h_{31}=L_1$" is satisfied, and the optical distance $h_{32}$ between the mirror surface 22 and the surface 12 of the tactile sense presentation body 10 is represented by the sum of the product $n_2 \cdot d_2$ of the thickness $d_2$ and the refractive index $n_2$ of the half mirror 20 and a distance $L_2$ between the opposite surface 24 opposite to the mirror surface 22 and the surface 12 of the tactile sense presentation body 10, that is, "$h_{32}=n_2 \cdot d_2+L_2$".

In a case where the position of the half mirror 20 and the position of the image display surface 32 are adjusted so that the optical distances $h_{31}$ and $h_{32}$ are equal to each other, the mirror image (virtual image) of an image displayed on the image display surface 32 of the image carrier 30 is observed from the observation part while coinciding with the surface of the tactile sense presentation body 10.

The integrated presentation device 3 according to this embodiment further comprises a position detection sensor 90 that detects the position of the finger of a user. Further, the tactile sense presentation body 10 comprises an artificial skin-sense presentation device 18. The integrated presentation device 3 further comprises an information processing unit 100 that is connected to the display 31, the position detection sensor 90, and the tactile sense presentation body 10.

A publicly known motion capture device can be appropriately used as the position detection sensor 90.

The artificial skin-sense presentation device 18 is a device that generates a signal stimulating at least one of senses based on a receptor present in the skin of a human, specifically, a tactile sense, a sense of pressure, a sense of warmth, a sense of cold, and a sense of pain. Since the artificial skin-sense presentation device 18 causes static electricity, electricity, vibration, ultrasonic waves, a change in temperature, or the like at a portion, which is touched by a user, of the surface 12 of the tactile sense presentation body 10, it is possible to stimulate a skin sense to allow a user to more realistically experience an object.

Examples of a specific artificial skin-sense presentation device 18 include a heater or a cooler that causes a change in temperature, a piezoelectric element that generates vibration, an electrostatic element, and an ultrasonic generator that generates ultrasonic waves; and the artificial skin-sense presentation device 18 comprises one of them or a combination of a plurality of elements of them.

The integrated presentation device 3 may comprise an additional artificial skin-sense presentation device that is disposed outside the tactile sense presentation body 10 in addition to the artificial skin-sense presentation device that changes the state of the surface of the tactile sense presentation body 10 and is provided in the tactile sense presentation body 10. Examples of the additional artificial skin-sense presentation device include a blower that supplies warm air, cold air, or the like to the finger of a user positioned on the tactile sense presentation unit 50, and an ultrasonic vibrator array that directly applies a vibration sense to the surface of the finger of a user.

Figure 6:
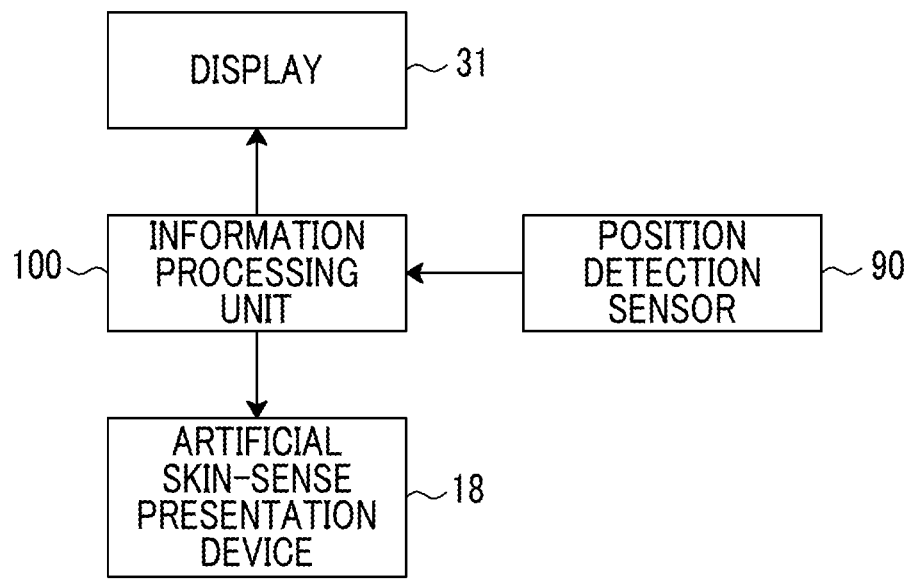
FIG. 6 is a block diagram showing the configuration of control that is performed by an information processing unit of the visual sense-and-tactile sense integrated presentation device according to the third embodiment.

The information processing unit 100 is a control unit that performs control to generate an optimum feel corresponding to an image while making the display of an image displayed by the display 31 and tactile information presented by the artificial skin-sense presentation device 18 interlock with each other (see FIG. 6). The information processing unit 100 is mounted on a computer that comprises well-known hardware configuration, such as a central processing unit (CPU), a main storage unit, an auxiliary storage unit, an input-output interface, and a communication interface. A predetermined program, which is used to control the display 31 and the artificial skin-sense presentation device 18 while making the display 31 and the artificial skin-sense presentation device 18 interlock with each other, is installed on the computer, and control for making the display of an image and tactile information interlock with each other can be realized by the execution of this program. The information processing unit 100 may be mounted on a portable information terminal, such as a tablet computer comprising the display 31.

Assume that a vibrating plate is provided as the artificial skin-sense presentation device 18 in a case where an object is a vibrating body, the image of the vibrating body (the motion picture of the vibrating body that is being vibrated) is displayed on the display 31 and the vibrating plate can be vibrated to vibrate the surface of the tactile sense presentation body 10 by the control of the information processing unit 100. Accordingly, it is possible to give a user an illusion that the user touches the vibrating body.

A topology display unit disclosed in JP2013-501992A, tactile information output means disclosed in JP2004-145456A, or the like may be applied as the artificial skin-sense presentation device 18. Further, a horizontal vibration array, a vertical vibration array, a rotating uneven body, a ultrasonic vibrator, a heater, a Peltier element (cooling element), an electrode array, or the like can also be applied other than those. In a case where these are applied, the shape of the surface of the tactile sense presentation body 10 can be changed according to an object.

Furthermore, the information processing unit 100 controls one or both of the display of an image on the display 31 and the skin-sense presentation state of the artificial skin-sense presentation device 18 according to the position information of the finger of a user that is detected by the position detection sensor 90.

Since visual information and tactile information interlock with each other as in this embodiment, a user can experience the more realistic sense of realism.

The integrated presentation device according to the embodiment of the invention may comprise a speaker, and may be adapted to generate sound so that the sound interlocks with the display of an image. A speaker, which is built in a tablet computer, a smartphone, or the like as an aspect of the visual sense presentation body, may be used as the speaker.

Since a visual sense, a tactile sense, and an auditory sense are stimulated at the same time in a case where auditory information is presented in addition to visual information and tactile information while interlocking with visual information and tactile information, it is possible to give a high sense of realism to a user by a cross-modal effect.

Figure 7:
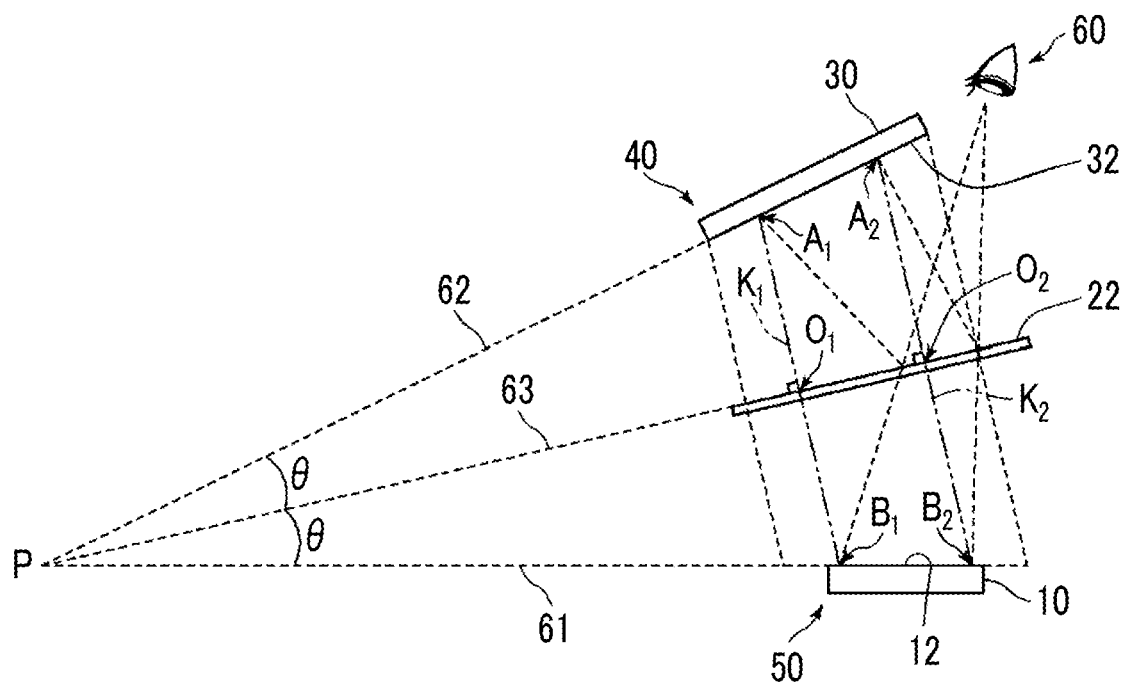
FIG. 7 is a schematic diagram showing another example of the arrangement of an image display surface, a mirror surface, and the surface of a tactile sense presentation body of the visual sense-and-tactile sense integrated presentation device according to the embodiment of the invention.

In the visual sense-and-tactile sense integrated presentation devices according to the respective embodiments, the image display surface on which the image of an image is displayed, the mirror surface, and the surface of the tactile sense presentation body have been adapted to be parallel to each other in a positional relationship. However, these surfaces may not be parallel to each other. FIG. 7 is a schematic diagram showing another example of the arrangement of the image display surface, the mirror surface, and the surface of the tactile sense presentation body of the visual sense-and-tactile sense integrated presentation device according to the embodiment of the invention.

In FIG. 7, the image display surface 32 and the surface 12 of the tactile sense presentation body 10 are disposed to be optically symmetric to each other with respect to the mirror surface 22. That is, the image display surface 32 and the surface 12 of the tactile sense presentation body 10 are disposed so that an optical distance between the mirror surface 22 and a position corresponding to the image display surface 32 and an optical distance between the mirror surface 22 and a position corresponding to the surface 12 of the tactile sense presentation body 10 are equal to each other. A position on the surface 12 of the tactile sense presentation body, which corresponds to a predetermined position on the image display surface 32, is a position $B_1$ where one perpendicular $K_1$ perpendicular to the mirror surface 22 at an arbitrary point $O_1$ intersects the surface 12 of the tactile sense presentation body 10 at a point $A_1$ where the perpendicular $K_1$ intersects the image display surface 32. A position on the surface 12 of the tactile sense presentation body 10, which corresponds to a position $A_2$ where a perpendicular $K_2$ perpendicular to the mirror surface 22 at another arbitrary point $O_2$ intersects the image display surface 32, is a point $B_2$ where the perpendicular $K_2$ intersects the surface 12 of the tactile sense presentation body 10. In a case where the image display surface 32 and the surface 12 of the tactile sense presentation body 10 are in a relationship where an optical distance between the mirror surface 22 and a position corresponding to the image display surface 32 and an optical distance between the mirror surface 22 and a position corresponding to the surface 12 of the tactile sense presentation body 10 are equal to each other, an optical distance between $A_1$ and $O_1$ is equal to an optical distance between $B_1$ and $O_1$ and an optical distance between $A_2$ and $O_2$ is equal to an optical distance between $B_2$ and $O_2$.

In a case where the optical distance between the image display surface 32 and the mirror surface 22 is equal to a physical distance therebetween and the optical distance between the surface 12 of the tactile sense presentation body 10 and the mirror surface 22 is equal to a physical distance therebetween and a line on the image display surface 32, a line on the surface 12 of the tactile sense presentation body 10, and a line on the mirror surface 22 extend, three extension lines intersect at one point P as shown in FIG. 7. Further, the three extension lines form two equal sides 61 and 62 of an isosceles triangle that has the point P as an apex and a median 63 that divides an angle between the two sides 61 and 62 in half.

Even in the case of the above-mentioned configuration, the virtual image of an image, which is displayed on the image display surface 32 of the visual sense presentation body 30, is seen from the observation part 60 while coinciding with the position of the surface 12 of the tactile sense presentation body 10. Accordingly, the same effects as the integrated presentation devices according to the first to third embodiments can be obtained.

The visual sense-and-tactile sense integrated presentation device according to each embodiment of the invention can be applied to a system shown in FIG. 8 that is connected to Internet and can communicate with a remote location.

For example, the visual sense-and-tactile sense integrated presentation device 1 comprises an information terminal 38 as the visual sense presentation body and can also form a system 101 that can communicate through Internet using the information terminal 38. The information terminal 38 is disposed on the support plate 41 of the visual sense presentation unit 40 of the integrated presentation device 1 as the visual sense presentation body. The system 101 is connected to Internet by the radio or wired communication function of the information terminal 38 and can receive image information, voice information, and the like from another information terminal 39 on Internet. In a case where the image of an object acquired by another information terminal 39 is reproduced by the information terminal 38, and the virtual image of the image is displayed while coinciding with the tactile sense presentation body 10, a user can feel as though the user actually touches the object present in a remote location.

What is claimed is:
1. A visual sense-and-tactile sense integrated presentation device comprising:
 a half mirror;
 a visual sense presentation body that presents visual information about an object and is disposed on a mirror surface side of the half mirror; and
 a tactile sense presentation body that presents tactile information and is disposed to face the visual sense presentation body across the mirror surface of the half mirror at an optical distance from the half mirror equal to an optical distance between the half mirror and the visual sense presentation body.
2. The visual sense-and-tactile sense integrated presentation device according to claim 1, further comprising:
 a finger illuminator that illuminates a finger of a user touching the tactile sense presentation body.
3. The visual sense-and-tactile sense integrated presentation device according to claim 2,
 wherein the finger illuminator applies the illumination light in two different directions in which the finger is illuminated from the front side of the user and from the lateral side of the user with the light traveling in parallel to a support base on which the tactile sense presentation body is placed.
4. The visual sense-and-tactile sense integrated presentation device according to claim 3,
 wherein the light emitted from the finger illuminator is sheet-like light parallel to the support base.
5. The visual sense-and-tactile sense integrated presentation device according to claim 2,
 wherein a wavelength of the illumination light of the finger illuminator is a wavelength of monochromatic light.
6. The visual sense-and-tactile sense integrated presentation device according to claim 5,
 wherein the illumination light has a peak wavelength in the range of 650 nm or more and 700 nm or less or a peak wavelength in the range of 500 nm or more and 650 nm or less.
7. The visual sense-and-tactile sense integrated presentation device according to claim 2,
 wherein the finger illuminator is disposed between the mirror surface and the tactile sense presentation body, and applies illumination light, of which spread toward the mirror surface and the tactile sense presentation body is limited, to a space between the mirror surface and the tactile sense presentation body.
8. The visual sense-and-tactile sense integrated presentation device according to claim 1,
 wherein the tactile sense presentation body comprises an artificial skin-sense presentation device.

9. The visual sense-and-tactile sense integrated presentation device according to claim 8,
wherein a display is provided as the visual sense presentation body, and
the visual sense-and-tactile sense integrated presentation device further comprises an information processing unit that is connected to the display and the artificial skin-sense presentation device and changes a skin-sense presentation state of the artificial skin-sense presentation device while interlocking with a change of an image to be displayed on the display.

10. The visual sense-and-tactile sense integrated presentation device according to claim 9, further comprising:
a sensor that detects a position of the finger of the user,
wherein the information processing unit controls the skin-sense presentation state of the artificial skin-sense presentation device on the basis of position information that is acquired by the sensor.

11. The visual sense-and-tactile sense integrated presentation device according to claim 1,
wherein the visual sense presentation body is an image carrier displaying an image of the object.

12. The visual sense-and-tactile sense integrated presentation device according to claim 1,
wherein the visual sense presentation body is a three-dimensional object.

13. The visual sense-and-tactile sense integrated presentation device according to claim 1,
wherein the tactile sense presentation body is a plane object or a three-dimensional object that includes a texture structure on a surface thereof.

14. The visual sense-and-tactile sense integrated presentation device according to claim 1,
wherein an information terminal is provided as the visual sense presentation body.

\* \* \* \* \*